(12) United States Patent
Zhao et al.

(10) Patent No.: US 12,488,765 B2
(45) Date of Patent: Dec. 2, 2025

(54) SPLICING DISPLAY DEVICE

(71) Applicant: TCL CHINA STAR OPTOELECTRONICS TECHNOLOGY CO., LTD., Guangdong (CN)

(72) Inventors: Jun Zhao, Guangdong (CN); Bin Zhao, Guangdong (CN); Juncheng Xiao, Guangdong (CN); Hongyuan Xu, Guangdong (CN); Shi Tang, Guangdong (CN); Guangmiao Wan, Guangdong (CN); Daobing Hu, Guangdong (CN); Meinan Li, Guangdong (CN); Maoxia Zhu, Guangdong (CN); Yu Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 112 days.

(21) Appl. No.: 18/139,976

(22) Filed: Apr. 27, 2023

(65) Prior Publication Data
US 2024/0221696 A1   Jul. 4, 2024

(30) Foreign Application Priority Data
Dec. 31, 2022   (CN) .......................... 202211738914.9

(51) Int. Cl.
*G09G 3/36*        (2006.01)
*G02F 1/1333*     (2006.01)
(Continued)

(52) U.S. Cl.
CPC ............. *G09G 3/36* (2013.01); *G02F 1/1333* (2013.01); *G02F 1/13336* (2013.01);
(Continued)

(58) Field of Classification Search
CPC .. G09G 3/30; G09G 3/32; G09G 3/34; G09G 3/3406; G09G 3/342; G09G 3/3426;
(Continued)

(56) References Cited

U.S. PATENT DOCUMENTS

2016/0267860 A1*  9/2016  Liu .......................... G09G 3/32
2022/0404659 A1* 12/2022  Qi ...................... G02F 1/133528

FOREIGN PATENT DOCUMENTS

CN   110570811 A  * 12/2019 ............... G09G 3/32
CN   113496683 A  * 10/2021

OTHER PUBLICATIONS

English Language Machine Translation of CN-113496683A (Year: 2021).*

(Continued)

*Primary Examiner* — Jason M Mandeville
(74) *Attorney, Agent, or Firm* — PV IP PC; Christopher S. Ruprecht

(57) ABSTRACT

The present application provides a splicing display device includes a liquid crystal display screen and an inorganic light emitting diode display screen. A color point coordinate of a color of a light emitted by the liquid crystal display screen in the CIE 1931 XYZ chromaticity diagram is in a first gamut triangle. A color point coordinate of a color of a light emitted by the inorganic light emitting diode display screen in the CIE 1931 XYZ chromaticity diagram is in a second gamut triangle. A gamut boundary of the second gamut triangle surrounds a gamut boundary of the first gamut triangle, and a difference between a NTSC color gamut corresponding to the second gamut triangle and a NTSC color gamut corresponding to the first gamut triangle is less than 30%.

10 Claims, 5 Drawing Sheets

(51) Int. Cl.
  *G02F 1/1335* (2006.01)
  *G02F 1/13357* (2006.01)
  *G09G 3/30* (2006.01)
  *G09G 3/32* (2016.01)
  *G09G 3/34* (2006.01)
  *G09G 5/02* (2006.01)
  *G09F 9/302* (2006.01)

(52) U.S. Cl.
  CPC ...... *G02F 1/1336* (2013.01); *G02F 1/133603* (2013.01); *G02F 1/133609* (2013.01); *G02F 1/133614* (2021.01); *G09G 3/30* (2013.01); *G09G 3/32* (2013.01); *G09G 3/3406* (2013.01); *G09G 3/342* (2013.01); *G09G 3/3426* (2013.01); *G09G 5/02* (2013.01); *G09F 9/3026* (2013.01); *G09G 2300/026* (2013.01); *G09G 2320/0242* (2013.01); *G09G 2320/0666* (2013.01)

(58) Field of Classification Search
  CPC ...... G09G 3/36; G09G 2300/026; G09G 5/02; G09G 2320/0242; G09G 2320/0666; G02F 1/1333; G02F 1/13336; G02F 1/1336; G02F 1/133603; G02F 1/133609; G02F 1/133614; G09F 9/3026
  USPC ........................................................ 345/690
  See application file for complete search history.

(56) References Cited

OTHER PUBLICATIONS

English Language Machine Translation of CN-113496683A (Year: 2019).*

* cited by examiner

SPLICING DISPLAY DEVICE

TECHNICAL FIELD

The present application relates to the field of display technologies, and especially relates to a splicing display device.

BACKGROUND

At present, to realize large-sized splicing by using splicing technology is one of the hotspots in the display field. However, some large-sized splicing display devices have a problem of generating color perception difference between different splicing screens in a same splicing display device.

SUMMARY

An object of the present application is to provide a splicing display device, so as to improve a problem of generating color perception difference in the splicing display device.

In order to achieve the object mentioned above, a technical solution is as follows.

A splicing display device, includes:
a liquid crystal display screen, a color point coordinate of a color of a light emitted by the liquid crystal display screen in the CIE 1931 XYZ chromaticity diagram is in a first gamut triangle; and
an inorganic light emitting diode display screen, a color point coordinate of a color of a light emitted by the inorganic light emitting diode display screen in the CIE 1931 XYZ chromaticity diagram is in a second gamut triangle;
a gamut boundary of the second gamut triangle surrounds a gamut boundary of the first gamut triangle, and a difference between a NTSC color gamut corresponding to the second gamut triangle and a NTSC color gamut corresponding to the first gamut triangle is less than 30%.

Beneficial effects: As the gamut boundary of the second gamut triangle surrounds the gamut boundary of the first gamut triangle, and the difference between the NTSC color gamut corresponding to the second gamut triangle and the NTSC color gamut corresponding to the first gamut triangle is less than 30%. A difference in color gamut between the liquid crystal display screen and the inorganic light emitting diode display screen is reduced, thus improving the problem of generating color perception difference in the splicing display device including the liquid crystal display screen and the inorganic light emitting diode display screen.

DETAILED DESCRIPTION OF THE EMBODIMENT

The technical solutions in the embodiments of the present application will be clearly and completely described below in conjunction with the drawings in the embodiments of the present application. Obviously, the embodiments described are only a part of the embodiments of the present application, rather than all the embodiments. Based on the embodiments in the present application, all other embodiments obtained by those skilled in the art without creative works should be deemed as falling within the claims of the present application.

Figure 1:
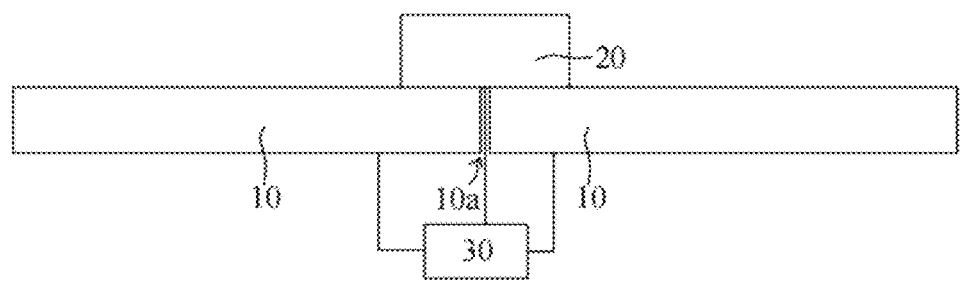
FIG. 1 is a simplified schematic diagram of a splicing display device according to an embodiment of the present application.
Figure 2:
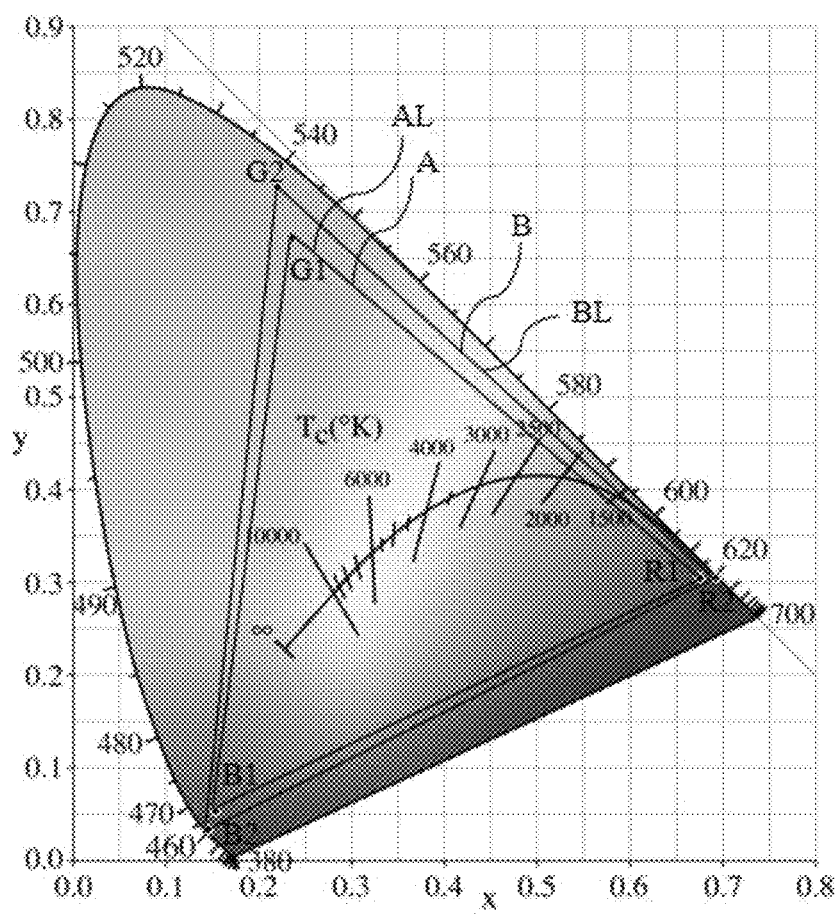
FIG. 2 is a graph of a CIE 1931 XYZ chromaticity diagram illustrating initial gamuts of colors of lights independently emitted by a liquid crystal display screen and an inorganic light emitting diode display screen shown in FIG. 1.
Figure 3:
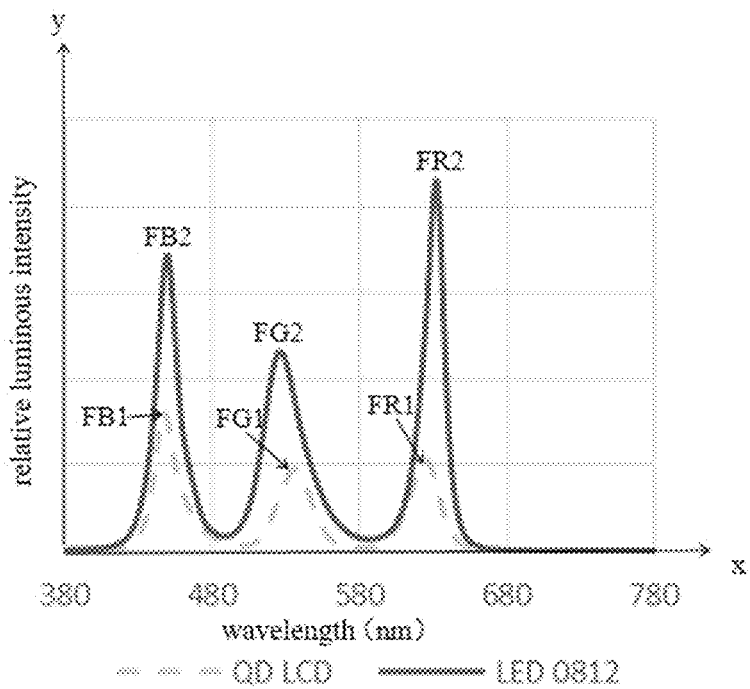
FIG. 3 is a graph illustrating luminescence spectrums of the liquid crystal display screen and the inorganic light emitting diode display screen shown in FIG. 1.
Figure 4:
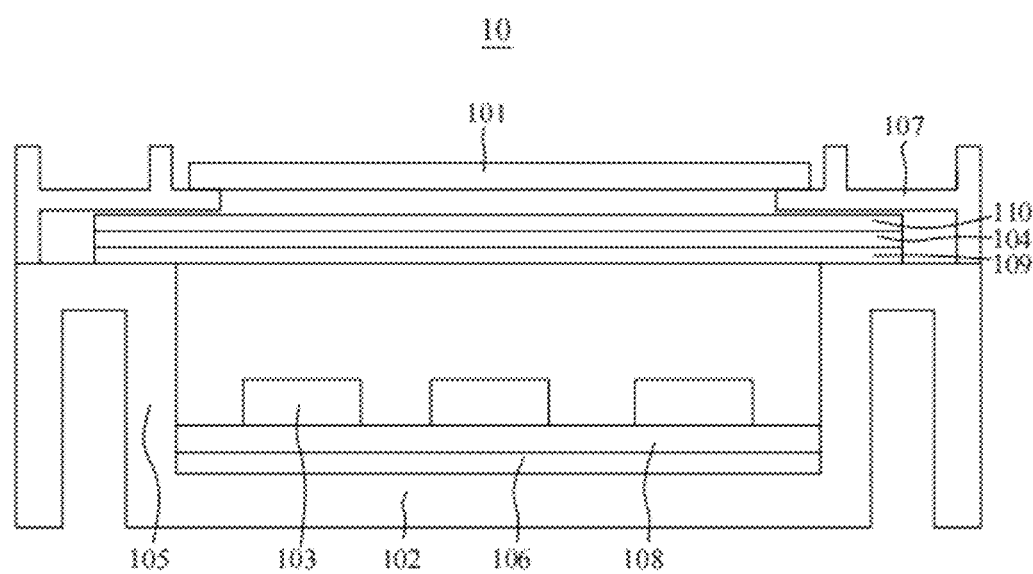
FIG. 4 is a schematic cross-sectional diagram of the liquid crystal display screen shown in FIG. 1.
Figure 5:
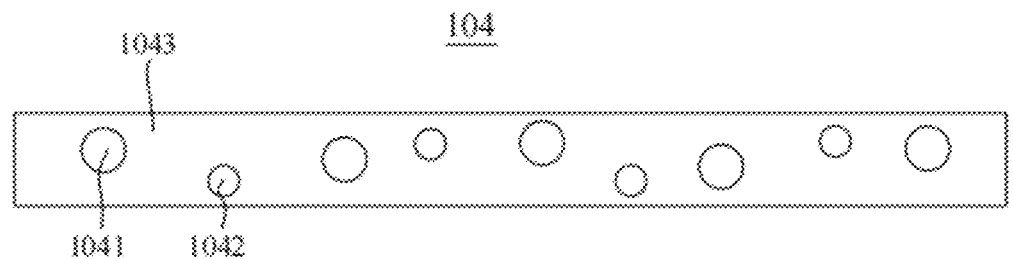
FIG. 5 is a schematic diagram of a quantum dot film shown in FIG. 4.

Please refer to FIG. 1 to FIG. 5. FIG. 1 is a simplified schematic diagram of a splicing display device according to an embodiment of the present application. FIG. 2 is a graph of a CIE 1931 XYZ chromaticity diagram illustrating initial gamuts of colors of lights independently emitted by a liquid crystal display screen and an inorganic light emitting diode display screen shown in FIG. 1. FIG. 3 is a graph illustrating luminescence spectrums of the liquid crystal display screen and the inorganic light emitting diode display screen shown in FIG. 1. FIG. 4 is a schematic cross-sectional diagram of the liquid crystal display screen shown in FIG. 1. FIG. 5 is a schematic diagram of a quantum dot film shown in FIG. 4.

In this embodiment, as shown in FIG. 1, a splicing display device 100 includes at least two liquid crystal display screens 10 that are spliced and at least one inorganic light emitting diode display screen 20. Each inorganic light emitting diode display screen 20 is disposed corresponding to a splicing position 10*a* of two adjacent liquid crystal display screens 10 that are spliced, and is disposed on two adjacent liquid crystal display screens 10.

In this embodiment, the inorganic light emitting diode display screen 20 is disposed corresponding to the splicing position 10*a* of two adjacent liquid crystal display screens 10 that are spliced, and is disposed on two adjacent liquid crystal display screens 10, so that the inorganic light emitting diode display screen 20 covers a splicing gap at the splicing position 10*a*, and the inorganic light emitting diode display screen 20 cooperates with the liquid crystal display screens 10 for display, thereby improving display effect of the splicing display device 100. In addition, compared with a problem of high cost caused by splicing a plurality of inorganic light emitting diode display screens 20 for display, the present application that splices at least two liquid crystal display screens 10 and disposes the inorganic light emitting diode display screen 20 in corresponding to the splicing position 10*a* is beneficial for reducing costs.

It should be noted that, in a related art, a light emitting principle of the liquid crystal display screen is different from that of the inorganic light emitting diode display screen. When the liquid crystal display screen and the inorganic light emitting diode display screen are spliced by hybrid for display, there is a problem that different viewing effects for a same color on the liquid crystal display screen and the inorganic light emitting diode display screen exists, thus affecting display effect of a splicing display device.

For the problem in the related art, the inventor has further analyzed and found that, for a same chromaticity, luminescence spectrums of the liquid crystal display screen and the inorganic light emitting diode display screen are different, that is, the liquid crystal display screen and the inorganic light emitting diode display screen of the splicing display device have a problem of metamerism failure. Thus, when a same color is displayed by the liquid crystal display screen and the inorganic light emitting diode display screen, there is a problem of color perception difference. In order to solve the problem in the related art, in the present application, an initial gamut of the liquid crystal display screen in the related art is increased, and an initial gamut of the inorganic light emitting diode display screen is adjusted, so that the initial gamut of the inorganic light emitting diode display screen surrounds the initial gamut of the liquid crystal display screen. On this basis, the initial gamut of the inorganic light emitting diode display screen and the initial gamut of the liquid crystal display screen approach to be same, so that a difference between the initial gamut of the liquid crystal display screen and the initial gamut of the inorganic light emitting diode display screen is reduced, which is beneficial to improve the problem of color perception difference in the splicing display device including the liquid crystal display screen and the inorganic light emitting diode display screen. That is, the problem of metamerism failure between the liquid crystal display screen and the inorganic light emitting diode display screen of the splicing display device is improved.

It should be noted that the initial gamut of the liquid crystal display screen is a gamut when the liquid crystal display screen is displayed independently, and is an inherent gamut of the liquid crystal display screen. Similarly, the initial gamut of the inorganic light emitting diode display screen is a gamut when the inorganic light emitting diode display screen is displayed independently.

In this embodiment, as shown in FIG. 2, a color point coordinate of a color of a light emitted by each liquid crystal display screen 10 in the CIE 1931 XYZ chromaticity diagram is in a first gamut triangle A. That is, the first gamut triangle A corresponds to the initial gamut of the liquid crystal display screen 10. A color point coordinate of a color of a light emitted by the inorganic light emitting diode display screen 20 in the CIE 1931 XYZ chromaticity diagram is in a second gamut triangle B. That is, the second gamut triangle B corresponds to the initial gamut of the inorganic light emitting diode display screen 20.

In this embodiment, a gamut boundary BL of the second gamut triangle B surrounds a gamut boundary AL of the first gamut triangle A, and a difference between a NTSC color gamut corresponding to the second gamut triangle B and a NTSC color gamut corresponding to the first gamut triangle A is less than 30%. As a result a difference in gamut between the liquid crystal display screen 10 and the inorganic light emitting diode display screen 20 is reduced, which provides conditions of approaching the gamut of the liquid crystal display screen 10 and the gamut of the inorganic light emitting diode display screen 20 to be same. The problem that perception difference on the liquid crystal display screen 10 and the inorganic light emitting diode display screen 20 occurs when a same color is displayed by the splicing display device 100.

Further, the difference between the NTSC color gamut corresponding to the second gamut triangle B and the NTSC color gamut corresponding to the first gamut triangle A is less than or equal to 20%. As a result, the difference in gamut between the liquid crystal display screen and the inorganic light emitting diode display screen is further reduced, which is further beneficial for approaching the gamuts of the liquid crystal display screen 10 and the inorganic light emitting diode display screen 20 to be same, thereby improving the problem of perception difference in the liquid crystal display screen 10 and the inorganic light emitting diode display screen 20 when a same color is displayed by the splicing display device 100.

It can be understood that the difference between the NTSC color gamut corresponding to the second gamut triangle B and the NTSC color gamut corresponding to the first gamut triangle A may be 2%, 4%, 6%, 8%, 10%, 12%, 14%, 16%, 18%, 20%, 22%, 24%, 26%, 28% or 29%.

In this embodiment, the NTSC color gamut corresponding to the second gamut triangle B is greater than or equal to 100% and less than or equal to 120%, so as to ensure that the NTSC color gamut corresponding to the second gamut triangle B is larger enough to surround the NTSC color gamut corresponding to the first gamut triangle A. Simultaneously, a problem that the second gamut triangle B is too large to cause a large difference in gamut between the second gamut triangle B and the first gamut triangle A is improved.

It can be understood that the NTSC color gamut corresponding to the second gamut triangle B may be 100%, 102%, 104%, 106%, 108%, 110%, 112%, 114%, 116%, 118% or 120%.

In this embodiment, the NTSC color gamut corresponding to the first gamut triangle A is greater than or equal to 90% and less than or equal to 110%, so that the NTSC color gamut corresponding to the first gamut triangle A of the liquid crystal display screen 10 is relatively larger than a NTSC color gamut (about 70%) corresponding to the liquid crystal display screen in the related art, and tends to be the same as the NTSC color gamut of the second gamut triangle B corresponding to the inorganic light emitting diode display screen 20.

It can be understood that the NTSC color gamut corresponding to the first gamut triangle A can be 90%, 92%, 94%, 96%, 98%, 100%, 102%, 104%, 106%, 108% or 110%.

Specifically, the NTSC color gamut corresponding to the first gamut triangle A is 93.8%, and the NTSC color gamut corresponding to the second gamut triangle B is 113.8%.

Please continue to refer to FIG. 2, three vertices of the first gamut triangle A are a first red color point R1 (x1, y1), a first blue color point B1 (x2, y2) and a first green color point G1 (x3, y3), respectively. Herein, x1 is greater than or equal to 0.6 and less than or equal to 0.7, and y1 is greater than or equal to 0.2 and less than or equal to 0.4. x2 is greater than or equal to 0.1 and less than or equal to 0.3, and y2 is greater than 0 and less than or equal to 0.1. x3 is greater than or equal to 0.15 and less than or equal to 0.3, and y3 is greater than or equal to 0.5 and less than or equal to 0.7.

In addition, three vertices of the second gamut triangle B are a second red color point R2 (x4, y4), a second blue color point B2 (x5, y5) and a second green color point G2 (x6, y6), respectively. Herein, x4 is greater than or equal to 0.65 and less than or equal to 0.75, and y4 is greater than or equal to 0.25 and less than or equal to 0.35. x5 is greater than or equal to 0.1 and less than or equal to 0.2, and y5 is greater than 0 and less than or equal to 0.1. x6 is greater than or equal to 0.15 and less than or equal to 0.3, and y6 is greater than or equal to 0.65 and less than or equal to 0.8.

Specifically, in this embodiment, x1 is set to 0.68, and y1 is set to 0.31; x2 is set to 0.15, and y2 is set to 0.05; x3 is set to 0.24, and y3 is set to 0.67; x4 is set to 0.69, and y4 is set to 0.31; x5 is set to 0.15, and y5 is set to 0.03; x6 is set to 0.22, and y6 is set to 0.73.

In this embodiment, as shown in FIG. 3, a luminescence spectrum of the liquid crystal display screen 10 includes a first blue peak wavelength FB1 in the blue spectrum, the luminescence spectrum of the liquid crystal display screen 10 includes a first green peak wavelength FG1 in the green spectrum, and the luminescence spectrum of the liquid crystal display screen 10 includes a first red peak wavelength FR1 in the red spectrum, so that the liquid crystal display screen 10 can emit a blue light, a green light, and a red light.

In addition, a luminescence spectrum of the inorganic light emitting diode display screen 20 includes a second blue peak wavelength FB2 in the blue spectrum, the luminescence spectrum of the inorganic light emitting diode display screen 20 includes a second green peak wavelength FG2 in the green spectrum, and the luminescence spectrum of the inorganic light emitting diode display screen 20 includes a second red peak wavelength FR2 in the red spectrum, so that the inorganic light emitting diode display screen 20 can also emit a blue light, a green light, and a red light.

It should be noted that, in some related art, in a backlight module of the liquid crystal display screen, light emitted by blue light emitting diodes is used to excite yellow phosphor powders to produce a blue light and a yellow light to produce which are mixed to produce a white light. The inorganic light emitting diode display screen emits a red light, a green light, and a blue light. As a result, a difference in luminescence spectrum between the liquid crystal display screen and the inorganic light emitting diode display screen in the related art is relatively large, resulting in a serious problem of metamerism failure in the splicing display device including the liquid crystal display screen and the inorganic light emitting diode display screen. However, in this embodiment, since both the liquid crystal display screen 10 and the inorganic light emitting diode display screen 20 can emit the blue lights, the green lights, and the red lights, the luminescence spectrums thereof tend to be same, thus further improving the problem of perception difference in the liquid crystal display screen 10 and the inorganic light emitting diode display screen 20 when a same color is displayed by the splicing display device 100.

In this embodiment, an absolute value of a difference between the first red peak wavelength FR1 and the second red peak wavelength FR2 is less than or equal to 10 nm. An absolute value of a difference between the first green peak wavelength FG1 and the second green peak wavelength FG2 is less than or equal to 15 nm. An absolute value of a difference between the first blue peak wavelength FB1 and the second blue peak wavelength FB2 is less than or equal to 5 nm. As a result, the luminescence spectrums of the liquid crystal display screen 10 and the inorganic light emitting diode display screen 20 tend to be more same, which is more beneficial to improve the problem of perception difference in the liquid crystal display screen 10 and the inorganic light emitting diode display screen 20 when the same color is displayed by the splicing display device 100.

In this embodiment, the first red peak wavelength FR1 is less than the second red peak wavelength FR2, so as to provide a condition for the gamut boundary BL of the second gamut triangle B to surround the gamut boundary AL of the first gamut triangle A. Herein, the first red peak wavelength FR1 is greater than or equal to 622 nm and less than or equal to 630 nm, and the second red peak wavelength FR2 is greater than or equal to 625 nm and less than or equal to 635 nm.

In this embodiment, the first green peak wavelength FG1 is greater than the second green peak wavelength FG2, so as to provide a condition for the gamut boundary BL of the second gamut triangle B to surround the gamut boundary AL of the first gamut triangle A. Herein, the first green peak wavelength FG1 is greater than or equal to 530 nm and less than or equal to 540 nm, and the second green peak wavelength FG2 is greater than or equal to 524 nm and less than or equal to 530 nm.

In this embodiment, the first blue peak wavelength FB1 is greater than or equal to the second blue peak wavelength FB2, so as to provide a condition for the gamut boundary BL of the second gamut triangle B to surround the gamut boundary AL of the first gamut triangle A. Herein, the first blue peak wavelength FB1 is greater than or equal to 445 nm and less than or equal to 450 nm. The second blue peak wavelength FB2 is greater than or equal to 445 nm and less than or equal to 450 nm.

In this embodiment, a relative luminous intensity of the first blue peak wavelength FB1 of the luminescence spectrum of the liquid crystal display screen 10 is greater than relative luminous intensities of the first green peak wavelength FG1 and the first red peak wavelength FR1, so that the blue light emitted by the liquid crystal display screen 10 has a higher luminous intensity.

In this embodiment, a relative luminous intensity of the second red peak wavelength FR2 of the luminescence spectrum of the inorganic light emitting diode display screen 20 is greater than a relative luminous intensity of the second blue peak wavelength FB2 of the luminescence spectrum of the inorganic light emitting diode display screen 20, and the relative luminous intensity of the second blue peak wavelength FB2 of the luminescence spectrum of the inorganic light emitting diode display screen 20 is greater than a relative luminous intensity of the second green peak wavelength FG2 of the luminescence spectrum of the inorganic light emitting diode display screen 20.

In this embodiment, a half-wave width of the luminescence spectrum of the liquid crystal display screen 10 in the green spectrum is greater than a half-wave width of the luminescence spectrum of the liquid crystal display screen 10 in the red spectrum, the half-wave width of the luminescence spectrum of the liquid crystal display screen 10 in the red spectrum is greater than a half-wave width of the luminescence spectrum of the liquid crystal display screen 10 in the blue spectrum, so that a saturation of the blue light emitted by the liquid crystal display screen 10 is greater.

Herein, the half-wave width of the luminescence spectrum of the liquid crystal display screen 10 in the red spectrum is greater than or equal to 20 nm and less than or equal to 25 nm. The half-wave width of the luminescence spectrum of the liquid crystal display screen 10 in the green spectrum is greater than or equal to 25 nm and less than or equal to 30 nm. The half-wave width of the luminescence spectrum of the liquid crystal display screen 10 in the blue spectrum is greater than or equal to 15 nm and less than or equal to 20 nm. Specifically, the half-wave width of the luminescence spectrum of the liquid crystal display screen 10 in the red spectrum is 22.8 nm. The half-wave width of the luminescence spectrum of the liquid crystal display screen 10 in the green spectrum is 26 nm. The half-wave width of the luminescence spectrum of the liquid crystal display screen 10 in the blue spectrum is 17.6 nm.

In this embodiment, a half-wave width of the luminescence spectrum of the inorganic light emitting diode display screen 20 in the green spectrum is greater than a half-wave width of the luminescence spectrum of the inorganic light emitting diode display screen 20 in the blue spectrum, and the half-wave width of the luminescence spectrum of the inorganic light emitting diode display screen 20 in the blue spectrum is greater than or equal to a half-wave width of the luminescence spectrum of the inorganic light emitting diode display screen 20 in the red spectrum, so that saturations of the red light and the blue light emitted by the inorganic light emitting diode display screen 20 is greater.

Herein, the half-wave width of the luminescence spectrum of the inorganic light emitting diode display screen 20 in the red spectrum is greater than or equal to 12 nm and less than or equal to 18 nm. The half-wave width of the luminescence spectrum of the inorganic light emitting diode display screen 20 in the green spectrum is greater than or equal to 28 nm and less than or equal to 35 nm. The half-wave width of the luminescence spectrum of the inorganic light emitting diode display screen 20 in the blue spectrum is greater than or equal to 15 nm and less than or equal to 20 nm. Specifically, the half-wave width of the luminescence spectrum of the inorganic light emitting diode display screen 20 in the red spectrum is 15.1 nm. The half-wave width of the luminescence spectrum of the inorganic light emitting diode display screen 20 in the green spectrum is 31.8 nm. The half-wave width of the luminescence spectrum of the inorganic light emitting diode display screen 20 in the blue spectrum is 16.6 nm.

In this embodiment, the half-wave width of the luminescence spectrum of the liquid crystal display screen 10 in the red spectrum is greater than the half-wave width of the luminescence spectrum of the inorganic light emitting diode display screen 20 in the red spectrum. The half-wave width of the luminescence spectrum of the liquid crystal display screen 10 in the green spectrum is less than the half-wave width of the luminescence spectrum of the inorganic light emitting diode display screen 20 in the green spectrum. The half-wave width of the luminescence spectrum of the liquid crystal display screen 10 in the blue spectrum is greater than the half-wave width of the luminescence spectrum of the inorganic light emitting diode display screen 20 in the blue spectrum.

In this embodiment, a dominant wavelength of the red light emitted by liquid crystal display screen 10 is less than a dominant wavelength of the red light emitted by the inorganic light emitting diode display screen 20, a dominant wavelength of the blue light emitted by the liquid crystal display screen 10 is greater than the blue light emitted by the inorganic light emitting diode display screen 20, and a dominant wavelength of the green light emitted by the liquid crystal display screen 10 is greater than a dominant wavelength of the green light emitted by the inorganic light emitting diode display screen 20, so that the gamut boundary BL of the second gamut triangle B surrounds the gamut boundary AL of the first gamut triangle A.

Herein, a difference of the dominant wavelength of the red light emitted by the inorganic light emitting diode display screen 20 minus the dominant wavelength of the red light emitted by the liquid crystal display screen 10 is less than or equal to 5 nm. A difference of the dominant wavelength of the blue light emitted by the liquid crystal display screen 10 minus the dominant wavelength of the blue light emitted by the inorganic light emitting diode display screen 20 is less than or equal to 10 nm. A difference of the dominant wavelength of the green light emitted by the liquid crystal display screen 10 minus the dominant wavelength of the green light emitted by the inorganic light emitting diode display screen 20 is less than or equal to 5 nm.

In this embodiment, the dominant wavelength of the red light emitted by the liquid crystal display screen 10 is greater than or equal to 618 nm and less than or equal to 622 nm. The dominant wavelength of the red light emitted by the inorganic light emitting diode display screen 20 is greater than or equal to 618 nm and less than or equal to 625 nm. Specifically, the dominant wavelength of the red light emitted by the liquid crystal display screen 10 is 618.6 nm, and the dominant wavelength of the red light emitted by the inorganic light emitting diode display screen 20 is 620.2 nm.

In this embodiment, the dominant wavelength of the green light emitted by the liquid crystal display screen 10 is greater than or equal to 530 nm and less than or equal to 540 nm. The dominant wavelength of the green light emitted by the inorganic light emitting diode display screen 20 is greater than or equal to 530 nm and less than or equal to 540 nm. Specifically, the dominant wavelength of the green light emitted by the liquid crystal display screen 10 is 536.7 nm, and the dominant wavelength of the green light emitted by the inorganic light emitting diode display screen 20 is 535.1 nm.

In this embodiment, the dominant wavelength of the blue light emitted by the liquid crystal display screen 10 is greater than or equal to 455 nm and less than or equal to 465 nm. The dominant wavelength of the blue light emitted by the inorganic light emitting diode display screen 20 is greater than or equal to 450 nm and less than or equal to 460 nm. Specifically, the dominant wavelength of the blue light emitted by the liquid crystal display screen 10 is 462.6 nm, and the dominant wavelength of the blue light emitted by the inorganic light emitting diode display screen 20 is 454.2 nm.

In this embodiment, a number of the liquid crystal display screens 10 may be two, four, or more than four. Two or more than two liquid crystal display screens 10 can be spliced and connected along a same direction, or can be spliced and connected along two directions perpendicular to each other.

In this embodiment, as shown in FIG. 4, each liquid crystal display screen 10 includes a liquid crystal display panel 101 and a backlight module 102. The liquid crystal display panel 101 is disposed at a light emitting side of the backlight module 102.

It can be understood that, in other embodiments, at least two liquid crystal display screens 10 that are spliced may include at least two liquid crystal display panels 101 and at least one backlight module 102, and one backlight module 102 provides backlight for at least two liquid crystal display panels 101. For example, one backlight module 102 provides backlight for two liquid crystal display panels 101.

In this embodiment, the liquid crystal display panel 101 includes an array substrate, an opposite substrate and a liquid crystal layer. The array substrate is disposed opposite to the opposite substrate, and the liquid crystal layer is disposed between the array substrate and the opposite substrate. Herein, one of the array substrate and the opposite substrate includes a color filter layer.

In this embodiment, the backlight module 102 includes a plurality of first blue light inorganic light emitting diodes 103 and quantum dot films 104 disposed at light emitting sides of the plurality of first blue light inorganic light emitting diodes 103.

In this embodiment, as shown in FIG. 5, the quantum dot film 104 includes a red light quantum dot 1041 and a green light quantum dot 1042. Material of each of the red light quantum dot 1041 and the green light quantum dot 1042 is independently selected from at least one of CdSe, CuInS/ZnS, ZnSe/ZnS, InP/ZnS and PbS/CdS. Herein, CuInS/ZnS is a quantum dot with a core-shell structure, CuInS is a core, ZnS is a shell. ZnSe/ZnS, InP/ZnS, and PbS/CdS are deduced in a same way, and details are not described here.

It should be noted that, as mentioned above, in some related arts, a light emitted by a blue light emitting diode is used to excite a yellow phosphor powder in a backlight module of a liquid crystal display screen, that is, Yttrium Aluminate Garnet (YAG) backlight is used, to form a blue light and a yellow light which are mixed to form a white light, and the NTSC color gamut the liquid crystal display screen in is about 70%. As a result, a difference in luminescence spectrum between the liquid crystal display screen and an inorganic light emitting diode display screen is quite large, and a difference in gamut between the liquid crystal display screen and the inorganic light emitting diode display screen is also quite large.

However, in this application, the first blue light inorganic light emitting diode 103 is matched with the red light quantum dot 1041 and the green light quantum dot 1042. The red light quantum dot 1041 is excited by a blue light emitted by the first blue light inorganic light emitting diode 103 and emits a red light, the green light quantum dot 1042 is also excited by the blue light emitted by the first blue light inorganic light emitting diode 103 and emits a green light, and a part of the blue lights pass through the quantum dot film 104, so that the backlight module 102 can emit the blue light, the red light, and the green light. Moreover, the blue light, the red light, and the green light emitted by the backlight module 102 pass through the liquid crystal display panel 101, so that the luminescence spectrum of the liquid crystal display screen 10 tends to be the same as the luminescence spectrum of the inorganic light emitting diode display screen 20, and it is also beneficial to increase the NTSC color gamut of the color of the light emitted by the liquid crystal display screen 10. Thus, the NTSC color gamut of the liquid crystal display screen 10 tends to be the same as the NTSC color gamut of the inorganic light emitting diode display screen 20.

In addition, in the backlight module, the quantum dot film is matched with the blue light inorganic light emitting diodes. A dominant wavelength of a light generated after a quantum dot is excited is affected by a particle size of the quantum dot in the quantum dot film, the dominant wavelength is related to a hue of the light. A half-wave width of luminous peak of the light is affected by a distribution of particle sizes of quantum dots in the quantum dot film. The half-wave width is related to a saturation of the light, and thus it is more beneficial to adjust the luminescence spectrum and the gamut of the liquid crystal display screen 10 by adjusting the particle size and the distribution of particle sizes of quantum dots in the quantum dot film, so as to adjust the luminescence spectrum and the gamut of the liquid crystal display screen 10 to be matched with the luminescence spectrum and the gamut of the inorganic light emitting diode display screen 20.

In this embodiment, the quantum dot film 104 further includes a transparent substrate 1043, and the red light quantum dot 1041 and the green light quantum dot 1042 are evenly dispersed in the transparent substrate 1043. A material of the transparent substrate 1043 includes but not limited to at least one of polyimide and polyethylene terephthalate.

In this embodiment, a material of the red light quantum dot 1041 is the same as that of the green light quantum dot 1042, and a particle size of the red light quantum dot 1041 is larger than that of the green light quantum dot 1042, so that the red light quantum dot 1041 and the green light quantum dot 1042 can be made of a same material, and a manufacturing process of the quantum dot film 104 is simplified.

In this embodiment, the particle size of the red light quantum dot 1041 is greater than or equal to 1 nm and less than or equal to 10 nm, and the particle size of the green light quantum dot 1042 is greater than or equal to 1 nm and less than or equal to 10 nm. For example, the particle size of the red light quantum dot 1041 is 5 nm, 6 nm, 7 nm, 8 nm, 9 nm or 10 nm. The particle size of the green light quantum dots 1042 is 1 nm, 2 nm, 3 nm, 4 nm, 5 nm, 6 nm, 7 nm, 8 nm, 9 nm or 10 nm.

Specifically, in this embodiment, materials of the red light quantum dot 1041 and the green light quantum dots 1042 are both CdSe. The particle size of the red quantum dots 1041 is 8 nm, and the particle size of the green quantum dots 1042 is 4 nm.

In this embodiment, the backlight module 102 further includes a back frame 105, a reflection sheet 106, a middle frame 107 and a first substrate 108.

In this embodiment, the back frame 105 includes an accommodating cavity, and the reflective sheet 106 is disposed in the accommodating cavity of the back frame 105 and disposed on a bottom plate of the back frame 105.

In this embodiment, the first substrate 108 is disposed on the reflection sheet 106, and the plurality of first blue light inorganic light emitting diodes 103 are disposed on a surface of the first substrate 108 away from the reflective sheet 106.

In this embodiment, the quantum dot film 104 is disposed on side plates of the back frame 105, and the quantum dot film 104 is disposed between a diffusion plate 109 and an optical film 110. Herein, the optical film 110 includes but not limited to a brightness enhancement film.

In this embodiment, the middle frame 107 is fixed on the back frame 105, and the liquid crystal display panel 101 is fixed on the middle frame 107, so that the liquid crystal display panel 101 is disposed at the light emitting side of the backlight module 102.

In this embodiment, a number of the inorganic light emitting diode display screen 20 may be one, two or more than two, and each inorganic light emitting diode display screen 20 is disposed corresponding to two adjacent liquid crystal display screens 10 that are spliced.

Figure 6:
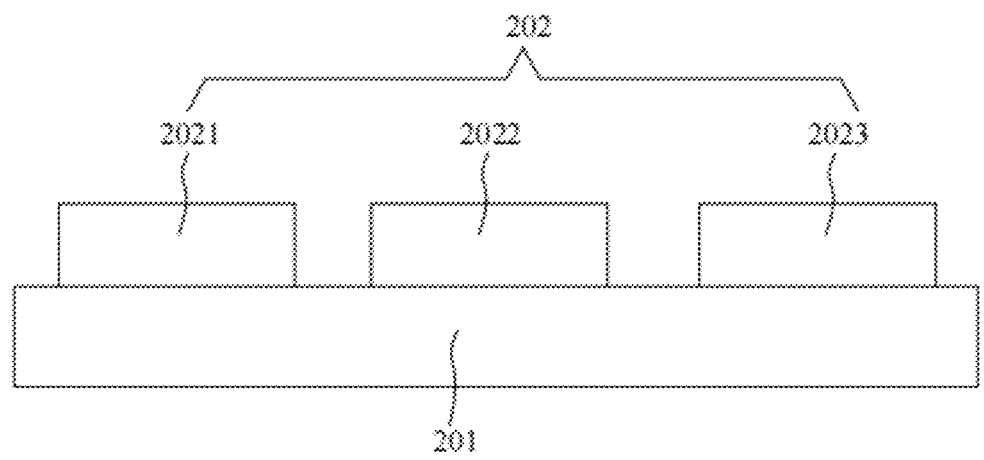
FIG. 6 is a schematic cross-sectional diagram of the inorganic light emitting diode display screen shown in FIG. 1.

In this embodiment, as shown in FIG. 6, the inorganic light emitting diode display screen 20 includes a second substrate 201 and a plurality of inorganic light emitting diodes 202. The plurality of inorganic light emitting diodes 202 are disposed on the second substrate 201.

In this embodiment, the second substrate 201 is a printed circuit board. It can be understood that the second substrate 201 may also be a glass substrate.

In this embodiment, the plurality of inorganic light emitting diodes 202 includes a first inorganic light emitting diode 2021, a second inorganic light emitting diode 2022 and a third inorganic light emitting diode 2023. The first inorganic light emitting diode 2021 is configured to emit a red light, the second inorganic light emitting diode 2022 is configured to emit a blue light, and the third inorganic light emitting diode 2023 is configured to emit a green light.

In this embodiment, as shown in FIG. 1, the splicing display device 100 further includes a processor 30 connected to the at least one inorganic light emitting diode display screen 20 and the at least two liquid crystal display screens 10. The processor 30 is configured to obtain a first grayscale data corresponding to the liquid crystal display screen 10 and a second grayscale data corresponding to the inorganic light emitting diode display screen 20 in one frame picture, and adjusts the second grayscale data to obtain a third grayscale data by using a first gamut data corresponding to the first grayscale data as a target gamut data of a second gamut data corresponding to the second grayscale data. The liquid crystal display screen displays according to the first grayscale data, and the inorganic light emitting diode display screen 20 displays according to the third grayscale data, so that the splicing display device 100 displays one frame picture.

It should be noted that since the initial gamut of the inorganic light emitting diode display screen 20 surrounds the initial gamut of the liquid crystal display screen 10, the aforesaid "the processor adjusts the second grayscale data to obtain a third grayscale data by using the first gamut data corresponding to the first grayscale data as the target gamut data of the second gamut data corresponding to the second grayscale data" is a process of gamut compression for the second gamut data corresponding to the second grayscale data by algorithm. Specifically, it is reflected in a display process of the splicing display device 100 as follows. For example, when the splicing display device 100 displays a pure green picture, the liquid crystal display screen 10 displays a pure green picture, in addition to the third inorganic light emitting diode 2023 of the inorganic light emitting diode display screen 20 being configured to emit a green light to display, at least one of the first inorganic light emitting diode 2021 and the second inorganic light emitting diode 2022 of the inorganic light emitting diode display screen 20 also emit lights for display.

Figure 7:
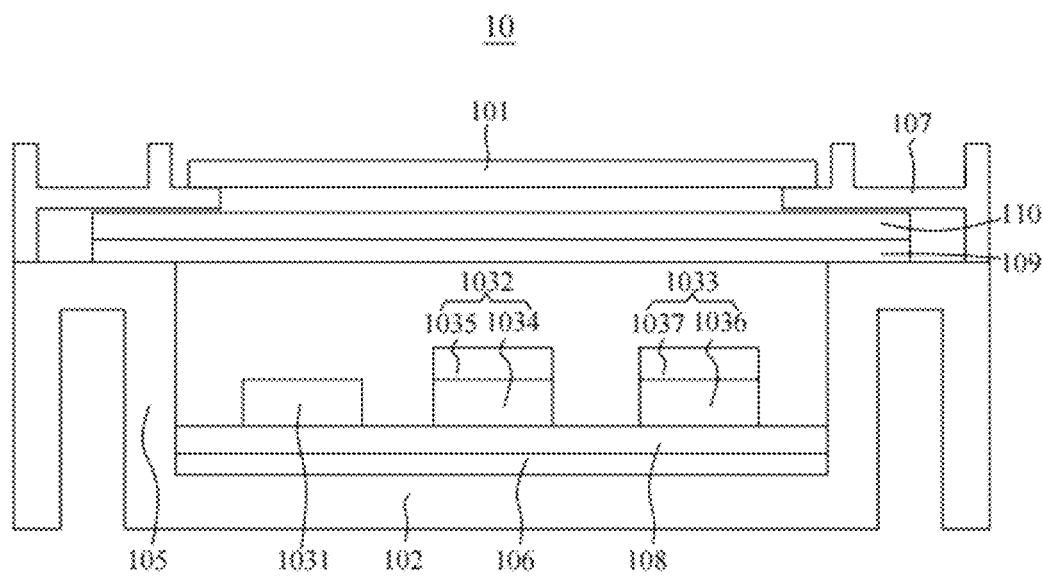
FIG. 7 is a schematic cross-sectional diagram of a liquid crystal display screen of a splicing display device according to another embodiment of the present application.
Figure 8:
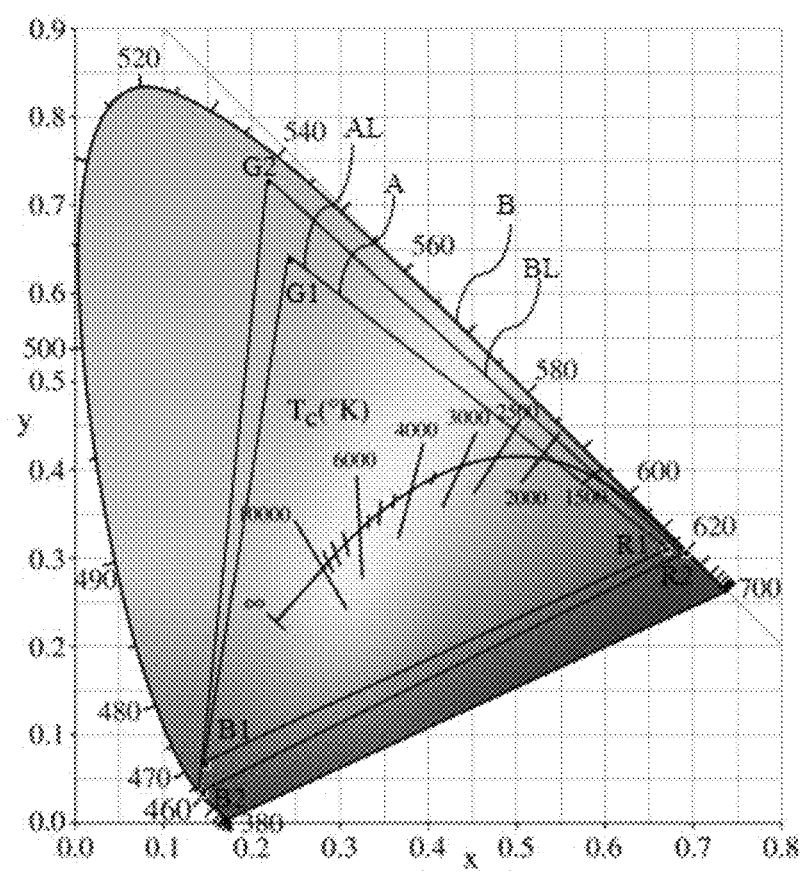
FIG. 8 is a graph of a CIE 1931 XYZ chromaticity diagram illustrating initial gamuts of colors of lights independently emitted by the liquid crystal display screen shown in FIG. 7 and the inorganic light emitting diode display screen shown in FIG. 6.
Figure 9:
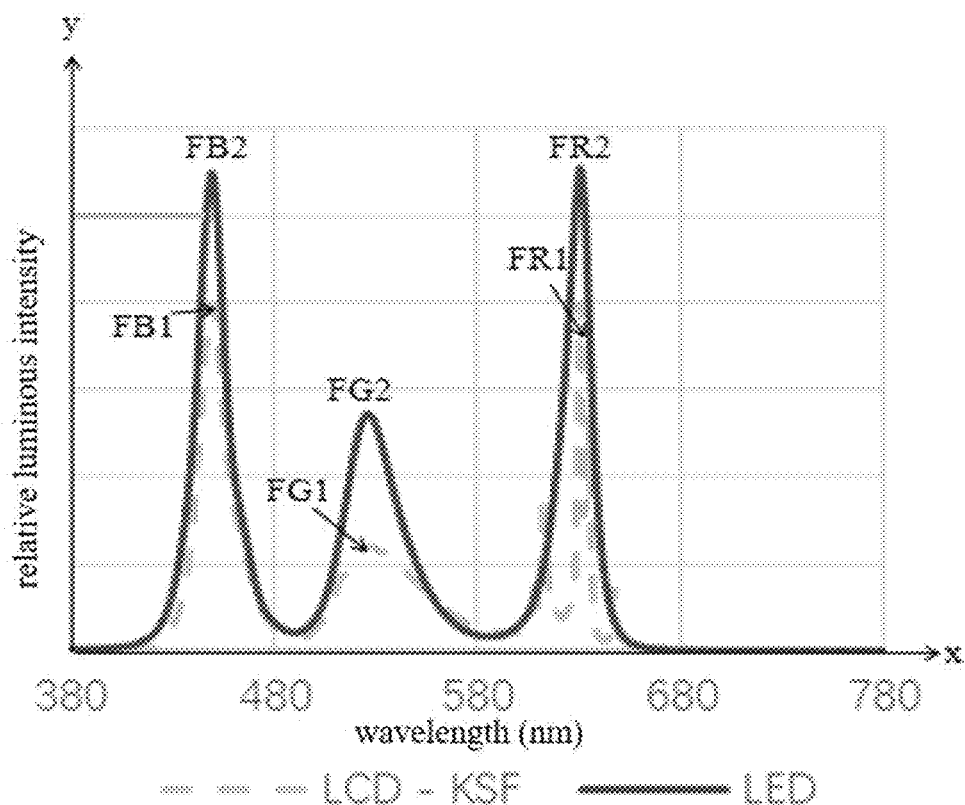
FIG. 9 is a graph illustrating luminescence spectrums of the liquid crystal display screen shown in FIG. 7 and the inorganic light emitting diode display screen shown in FIG. 6.

Please refer to FIGS. 7 to 9. FIG. 7 is a schematic cross-sectional diagram of a liquid crystal display screen of a splicing display device according to another embodiment of the present application. FIG. 8 is a graph of a CIE 1931 XYZ chromaticity diagram illustrating initial gamuts of colors of lights independently emitted by the liquid crystal display screen shown in FIG. 7 and the inorganic light emitting diode display screen shown in FIG. 6. FIG. 9 is a graph illustrating luminescence spectrums of the liquid crystal display screen shown in FIG. 7 and the inorganic light emitting diode display screen shown in FIG. 6.

The splicing display device of this embodiment is basically similar to the splicing display device shown in FIG. 1, similarities is not repeated, and differences include the following: a backlight module 102 of a liquid crystal display screen 10 shown in FIG. 7 does not include the quantum dot film 104; and the backlight module 102 of the liquid crystal display screen 10 shown in FIG. 7 includes a second blue light inorganic diode 1031, a red light inorganic light emitting diode 1032, and a green light inorganic light emitting diode 1033. The red light inorganic light emitting diode 1032 includes a third blue light inorganic diode 1034 and a red light phosphor power 1035 disposed at a light emitting side of the third blue light inorganic diode 1034. The green light inorganic light emitting diode 1033 includes a fourth blue light inorganic diode 1036 and a green light phosphor power 1037 at a light emitting side of the fourth blue light inorganic diode 1036.

In this embodiment, the red light phosphor powder 1035 includes but not limited to $K_2SiF_6:Mn^{4+}$. The green light phosphor powder 1037 includes but not limited to β-SiAlON:$Eu^{2+}$.

It should be noted that the third blue light inorganic diode 1034 is matched with $K_2SiF_6:Mn^{4+}$, so that the backlight module can emit a red light with a wavelength greater than or equal to 628 nm and less than or equal to 632 nm.

In this embodiment, a NTSC color gamut corresponding to a first gamut triangle A is 94%, and a NTSC color gamut corresponding to a second gamut triangle B is 113.8%, so that a difference in initial gamut between the liquid crystal display screen 10 shown in FIG. 7 and the inorganic light emitting diode display screen shown in FIG. 6 is equal to 19.8%, and the difference in initial gamut between the liquid crystal display screen 10 shown in FIG. 7 and the inorganic light emitting diode display screen shown in FIG. 6 is less.

Herein, in FIG. 8, three vertices of the first gamut triangle A are a first red color point R1 (x1, y1), a first blue color point B1 (x2, y2) and a first green color point G1 (x3, y3), respectively. x1 is greater than or equal to 0.65 and less than or equal to 0.70, and y1 is greater than or equal to 0.28 and less than or equal to 0.32. x2 is greater than or equal to 0.13 and less than or equal to 0.16, and y2 is greater than or equal to 0.05 and less than or equal to 0.08. x3 is greater than or equal to 0.15 and less than or equal to 0.3, and y3 is greater than or equal to 0.55 and less than or equal to 0.68. Specifically, x1 is set to 0.67, and y1 is set to 0.31; x2 is set to 0.15, and y2 is set to 0.07; and x3 is set to 0.24, and y3 is set to 0.64.

In this embodiment, the second gamut triangle B in FIG. 8 is the same as the second gamut triangle B in FIG. 2, and it is not repeated here.

In this embodiment, a luminescence spectrum of the liquid crystal display screen 10 shown in FIG. 9 includes a first red peak wavelength FR1 in the red spectrum, a first blue peak wavelength FB1 in the blue spectrum, and a first green peak wavelength FG1 in the green spectrum, so that the luminescence spectrum of the liquid crystal display screen 10 tends to be the same as the luminescence spectrum of the inorganic light emitting diode display screen 20.

In this embodiment, in the backlight module, the third blue light inorganic diode 1034 is matched with the red light phosphor power 1035 to emit a red light that is pure, and the fourth blue light inorganic diode 1036 is matched with the green light phosphor power 1037 to emit a green light that is pure, with which that the second blue light inorganic diode 1031 emits a blue light are matched, so that the backlight module emits the red light, the green light and the blue light that are pure, and then makes the liquid crystal display screen 10 emit a red light, a green light and a blue light. As a result, the luminescence spectrum of the liquid crystal display screen 10 and the luminescence spectrum of the inorganic light emitting diode display screen 20 tend to be same, and it is also beneficial to improve the NTSC color gamut of the color of the light emitted by the liquid crystal display screen 10, so that the NTSC color gamut of the liquid crystal display screen 10 and the NTSC color gamut of the inorganic light-emitting diode display screen 20 tend to be same, thus improving the problem of perception difference in the liquid crystal display screen 10 and the inorganic light emitting diode display screen 20 when the same color is displayed by the splicing display device 100.

It should be noted that a light emitting principle of the backlight module of this embodiment is different from that of the backlight module shown in FIG. 4. However, both the backlight modules of this embodiment and shown in FIG. 4 can emit red lights, blue lights and green lights, so that the luminescence spectrum of the liquid crystal display screen 10 and the luminescence spectrum of the inorganic light emitting diode display screen 20 tend to be same, and it is also beneficial to improve the NTSC color gamut of the color of the light emitted by the liquid crystal display screen 10, thus improving the problem perception difference in the liquid crystal display screen 10 and the inorganic light emitting diode display screen 20 when the same color is displayed by the splicing display device 100.

The descriptions of the above-mentioned embodiments are only used to help understand the technical solutions and core ideas of the present application. Those of ordinary skill in the art should understand that they can still modify the technical solutions described in the foregoing embodiments, or equivalently replace some of the technical features; and these modifications or replacements do not cause the essence of the corresponding technical solutions to deviate from the scope of the technical solutions of the embodiments of the present application.

What is claimed is:

1. A splicing display device, comprising:
    a liquid crystal display screen, wherein a color point coordinate of a color of a light emitted by the liquid crystal display screen in the CIE 1931 XYZ chromaticity diagram is in a first gamut triangle; and
    an inorganic light emitting diode display screen, wherein a color point coordinate of a color of a light emitted by the inorganic light emitting diode display screen in the CIE 1931 XYZ chromaticity diagram is in a second gamut triangle;
    wherein a gamut boundary of the second gamut triangle surrounds a gamut boundary of the first gamut triangle, and a difference between a NTSC color gamut corresponding to the second gamut triangle and a NTSC color gamut corresponding to the first gamut triangle is less than 30%;
    wherein a luminescence spectrum of the liquid crystal display screen comprises a first blue peak wavelength in the blue spectrum, the luminescence spectrum of the liquid crystal display screen comprises a first green peak wavelength in the green spectrum, and the luminescence spectrum of the liquid crystal display screen further comprises a first red peak wavelength in the red spectrum; and
    wherein a luminescence spectrum of the inorganic light emitting diode display screen comprises a second blue peak wavelength in the blue spectrum, the luminescence spectrum of the inorganic light emitting diode display screen comprises a second green peak wavelength in the green spectrum, and the luminescence spectrum of the inorganic light emitting diode display screen further comprises a second red peak wavelength in the red spectrum;
    wherein a dominant wavelength of a red light emitted by the liquid crystal display screen is less than a dominant wavelength of a red light emitted by the inorganic light emitting diode display screen;
    a dominant wavelength of a blue light emitted by the liquid crystal display screen is greater than a dominant wavelength of a blue light emitted by the inorganic light emitting diode display screen; and
    a dominant wavelength of a green light emitted by the liquid crystal display screen is greater than a dominant wavelength of a green light emitted by the inorganic light emitting diode display screen;
    wherein a difference of the dominant wavelength of the red light emitted by the inorganic light emitting diode display screen minus the dominant wavelength of the red light emitted by the liquid crystal display screen is less than or equal to 5 nm;
    a difference of the dominant wavelength of the blue light emitted by the liquid crystal display screen minus the dominant wavelength of the blue light emitted by the inorganic light emitting diode display screen is less than or equal to 10 nm; and
    a difference of the dominant wavelength of the green light emitted by the liquid crystal display screen minus the dominant wavelength of the green light emitted by the inorganic light emitting diode display screen is less than or equal to 5 nm.

2. The splicing display device of claim 1, wherein the difference between the NTSC color gamut corresponding to the second gamut triangle and the NTSC color gamut corresponding to the first gamut triangle is less than or equal to 20%.

3. The splicing display device of claim 1, wherein the NTSC color gamut corresponding to the second gamut triangle is greater than or equal to 100% and is less than or equal to 120%, and the NTSC color gamut corresponding to the first gamut triangle is greater than or equal to 90% and is less than or equal to 110%.

4. The splicing display device of claim 1, wherein an absolute value of a difference between the first red peak wavelength and the second red peak wavelength is less than or equal to 10 nm;
    wherein an absolute value of a difference between the first green peak wavelength and the second green peak wavelength is less than or equal to 15 nm; and
    wherein an absolute value of a difference between the first blue peak wavelength and the second blue peak wavelength is less than or equal to 5 nm.

5. The splicing display device of claim 1, wherein the liquid crystal display screen comprises a backlight module, the backlight module comprises a plurality of first blue light inorganic light emitting diodes and quantum dot films disposed at light emitting sides of the plurality of first blue light inorganic light emitting diodes, and the quantum dot films comprise a red light quantum dot and a green light quantum dot.

6. The splicing display device of claim 5, wherein a material of each of the red light quantum dot and the green light quantum dot is independently selected from at least one of CdSe, CuInS/ZnS, ZnSe/ZnS, InP/ZnS and PbS/CdS.

7. The splicing display device of claim 1, wherein the liquid crystal display screen comprises a backlight module, and the backlight module comprises:
    a second blue light inorganic light emitting diode;
    a red light inorganic light emitting diode comprising a third blue light inorganic diode and a red light phosphor power disposed on a light emitting surface of the third blue light inorganic diode; and
    a green light inorganic light emitting diode comprising a fourth blue light inorganic diode and a green light phosphor powder disposed on a light emitting surface of the fourth blue light inorganic diode.

8. The splicing display device of claim 7, wherein the red light phosphor powder comprises $K_2SiF_6:Mn^{4+}$, and the green light phosphor powder comprises $\beta$-SiAlON:Eu$^{2+}$.

9. The splicing display device of claim 1, wherein three vertices of the first gamut triangle are a first red color point R1 (x1, y1), a first blue color point B1 (x2, y2), and a first green color point G1 (x3, y3), respectively;

x1 is greater than or equal to 0.6 and less than or equal to 0.7, and y1 is greater than or equal to 0.2 and less than or equal to 0.4;

x2 is greater than or equal to 0.1 and less than or equal to 0.3, and y2 is greater than 0 and less than or equal to 0.1; and x3 is greater than or equal to 0.15 and less than or equal to 0.3, and y3 is greater than 0.5 and less than or equal to 0.7; and wherein three vertices of the second gamut triangle are a second red color point R2 (x4, y4), a second blue color point B2 (x5, y5), and a second green color point G2 (x6, y6), respectively;

x4 is greater than or equal to 0.65 and less than or equal to 0.75, and y4 is greater than or equal to 0.25 and less than or equal to 0.35;

x5 is greater than or equal to 0.1 and less than or equal to 0.2, and y5 is greater than 0 and less than or equal to 0.1; and x6 is greater than or equal to 0.15 and less than or equal to 0.3, and y6 is greater than or equal to 0.65 and less than or equal to 0.8.

10. The splicing display device of claim 1, comprising at least two liquid crystal display screens being spliced, each inorganic light emitting diode display screen is disposed corresponding to a splicing position of two adjacent ones of the at least two liquid crystal display screens and is disposed on the two adjacent ones of the at least two liquid crystal display screens.

\* \* \* \* \*